US012592784B2

(12) United States Patent
Zhang et al.

(10) Patent No.: US 12,592,784 B2
(45) Date of Patent: Mar. 31, 2026

(54) TRANSCEIVER LOOPBACK DATA PATH

(71) Applicant: Xilinx, Inc., San Jose, CA (US)

(72) Inventors: Wenfeng Zhang, San Jose, CA (US); Parag Upadhyaya, San Jose, CA (US)

(73) Assignee: XILINX, INC., San Jose, CA (US)

( * ) Notice: Subject to any disclaimer, the term of this patent is extended or adjusted under 35 U.S.C. 154(b) by 121 days.

(21) Appl. No.: 18/463,078

(22) Filed: Sep. 7, 2023

(65) Prior Publication Data

US 2025/0088287 A1    Mar. 13, 2025

(51) Int. Cl.
| | |
|---|---|
| *H04B 17/00* | (2015.01) |
| *H02H 9/04* | (2006.01) |
| *H04B 1/48* | (2006.01) |
| *H04B 17/14* | (2015.01) |

(52) U.S. Cl.
CPC ......... *H04B 17/0085* (2013.01); *H02H 9/046* (2013.01); *H04B 1/48* (2013.01); *H04B 17/14* (2015.01)

(58) Field of Classification Search
CPC ...... H04B 17/0085; H04B 1/48; H04B 17/14; H02H 9/046
See application file for complete search history.

(56) References Cited

U.S. PATENT DOCUMENTS

| | | | | |
|---|---|---|---|---|
| 8,498,591 B1 * | 7/2013 | Qian | ..................... | H03F 1/3241 |
| | | | | 455/114.3 |
| 9,088,399 B1 * | 7/2015 | Poon | ....................... | H04L 1/243 |
| 10,790,873 B2 * | 9/2020 | Pandey | ..................... | H04B 3/28 |
| 2007/0104111 A1 * | 5/2007 | Kakizawa | ........ | G01R 31/31716 |
| | | | | 370/252 |
| 2012/0257656 A1 * | 10/2012 | Kang | ..................... | H04B 1/525 |
| | | | | 375/221 |
| 2013/0058387 A1 * | 3/2013 | Muhammad | ........... | H04B 15/04 |
| | | | | 375/222 |
| 2013/0173203 A1 * | 7/2013 | Palaskas | .......... | G01R 31/31813 |
| | | | | 702/117 |
| 2013/0286517 A1 * | 10/2013 | Tian | ......................... | H02H 3/20 |
| | | | | 361/56 |
| 2018/0359060 A1 * | 12/2018 | Kim | ...................... | G06F 11/267 |

FOREIGN PATENT DOCUMENTS

| | | | | | |
|---|---|---|---|---|---|
| EP | | 3300267 A1 * | 3/2018 | ............. | H04B 17/14 |
| WO | WO-2018111454 A1 * | | 6/2018 | ............... | H04B 1/04 |

OTHER PUBLICATIONS

Machine translation of DE-102019202308-A1 (Year: 2019).*

* cited by examiner

*Primary Examiner* — Jean B Corrielus
(74) *Attorney, Agent, or Firm* — Slater Matsil, LLP

(57) ABSTRACT

A transceiver circuit is disclosed. The transceiver circuit includes a transmitter driver circuit configured to drive a transmit antenna. The transceiver circuit also includes a receiver circuit configured to generate digital signals based on received signals. The transceiver circuit also includes a loopback data path circuit electrically connected to the transmitter driver circuit and to the receiver circuit, where the loopback data path circuit is configured to conditionally provide signals from the transmitter driver circuit to the receiver circuit according to one or more control signals. The transceiver circuit also includes a controller configured to generate the control signals.

20 Claims, 7 Drawing Sheets

100

400

600

610 — GENERATE
TRANSMISSION
SIGNAL DATA

620 — CAUSE LOOPBACK
DATA PATH TO BE OFF

630 — TRANSMIT
TRANSMISSION SIGNAL
DATA TO TRANSMITTER

640 — GENERATE RF SIGNALS
WITH TRANSMITTER

650 — PROVIDE RF SIGNALS
TO ANTENNA

700

710 — CAUSE LOOPBACK DATA PATH TO BE OFF

720 — CAUSE ANTENNA RECEIVER PATH TO BE ON

730 — TRANSMIT RF DATA TO RECEIVER

740 — GENERATE DIGITAL SIGNALS WITH RECEIVER

TRANSCEIVER LOOPBACK DATA PATH

TECHNICAL FIELD

The present invention relates generally to loopback data paths used for testing transceiver circuits, and, in particular implementations, to loopback data paths that receive transmitter data from a transmitter path and provide the transmitter data to a receiver path.

BACKGROUND

Transceiver circuits may use loopback data paths to test transmitter circuitry and/or receiver circuitry. For example, test data may be generated and converted to transmission data by transmitter circuitry using circuitry for transmitting the transmission data. In addition, the test data may be converted by a loopback data path to receiver data for receiver circuitry, which receives the receiver data and converts the receiver data to a digital receiver signal. The digital receiver signal may be compared with the digital data corresponding with the test data as an indication of whether the transceiver circuit is functioning properly.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
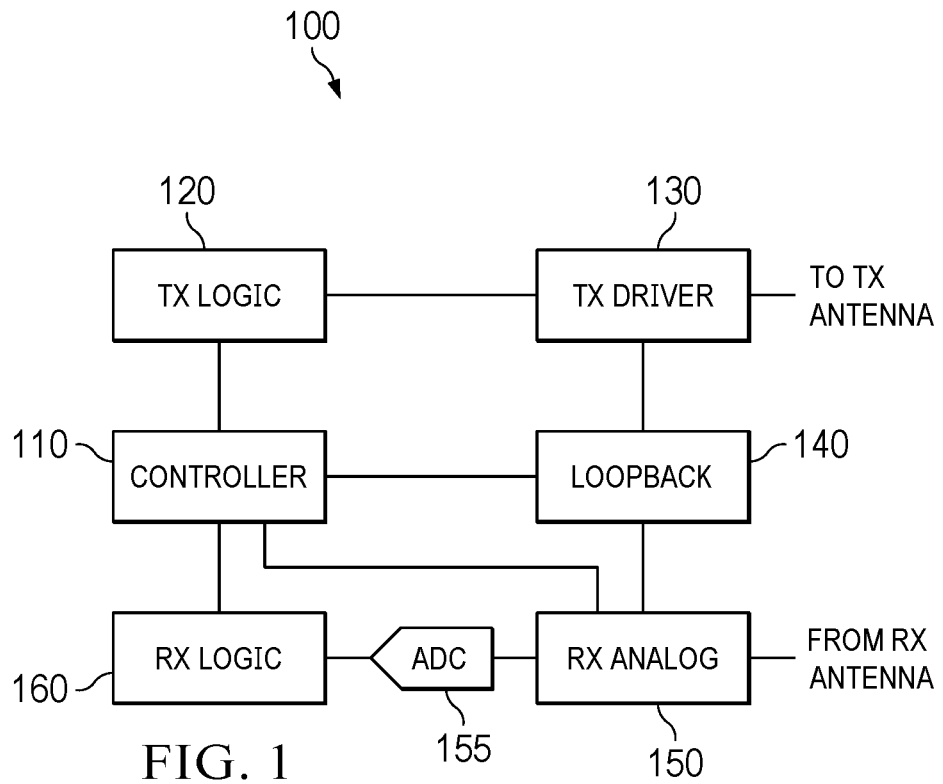
FIG. 1 illustrates a schematic block diagram of an example transceiver circuit including a loopback data path in accordance with implementations of the invention.

Corresponding numerals and symbols in the different figures generally refer to corresponding parts unless otherwise indicated. The figures are drawn to illustrate the relevant aspects of the implementations and are not necessarily drawn to scale. The edges of features drawn in the figures do not necessarily indicate the termination of the extent of the feature.

DETAILED DESCRIPTION OF ILLUSTRATIVE IMPLEMENTATIONS

The making and using of various implementations are discussed in detail below. It should be appreciated, however, that the various implementations described herein are applicable in a wide variety of specific contexts. The specific implementations discussed are merely illustrative of specific ways to make and use various implementations, and should not be construed in a limited scope. Unless specified otherwise, at least in some occurrences, the expressions "around", "approximately", and "substantially" may signify within 10%, and preferably within 5% of the given value or, such as in the case of substantially zero, less than 10% and preferably less than 5% of a comparable quantity.

Reference to "an implementation," "one implementation," "an embodiment," or "one embodiment" in the framework of the present description is intended to indicate that a particular configuration, structure, or characteristic described in relation to the implementation/embodiment is included in at least one implementation/embodiment. Hence, phrases such as "in one implementation" or "in one embodiment" that may be present in one or more points of the present description do not necessarily refer to one and the same implementation/embodiment. Moreover, particular conformations, structures, or characteristics may be combined in any adequate way in one or more implementations/embodiments. The references used herein are provided merely for convenience and hence do not define the extent of protection or the scope of the implementations/embodiments.

Because of the sensitivity of transmitter circuitry to, for example, loopback data path loading, conventional loopback data paths exclude important transmitter circuitry used for RF or other signal, such as high speed signal, other analog signal or other digital signal transmission. Accordingly, the excluded transmitter circuitry is not tested when the loopback data path is used. Therefore, more comprehensive loopback data paths are desirable.

Aspects and techniques described herein maximize the amount of transmitter circuitry used to generate signals for functionality testing. As a result, the generated signals represent the functionality of as much of the transmitter circuitry as is practical. To maximize the amount of transmitter circuitry used to generate the signals, the loopback data path is electrically connected to a termination and electrostatic discharge (ESD) protection circuit between a driver circuit and an output node configured to be connected to a transmitter antenna or other channel medium, such as extra short reach (XSR), very short reach (VSR), medium reach, long reach (LR), or another channel medium. Because the loopback data path circuit is electrically connected so close to the output node along the signal path, certain replica circuitry mimicking the transmitter signal path is not needed.

Implementations provided below describe various circuits and methods for testing functionality of a transceiver circuit, and in particular implementations, circuits and methods for effectively testing transmitter circuitry of the transceiver circuit. The implementations may be applied to numerous integration arrangements. For example, the transmitters discussed may be on different chips or different packages. In some implementations, aspects discussed herein are applied to chiplet architecture or another 3D stacking architecture. The method implementations may be applied to circuits in any stage of production expected to have functional circuitry. For example, some method implementations are performed on a single die having both a transmitter and a receiver. Some method implementations are performed on one or more semiconductor dies on one or more wafers. Some method implementations are performed on packaged circuits. Some method implementations are performed on circuits at other levels of packaging.

Figure 2:
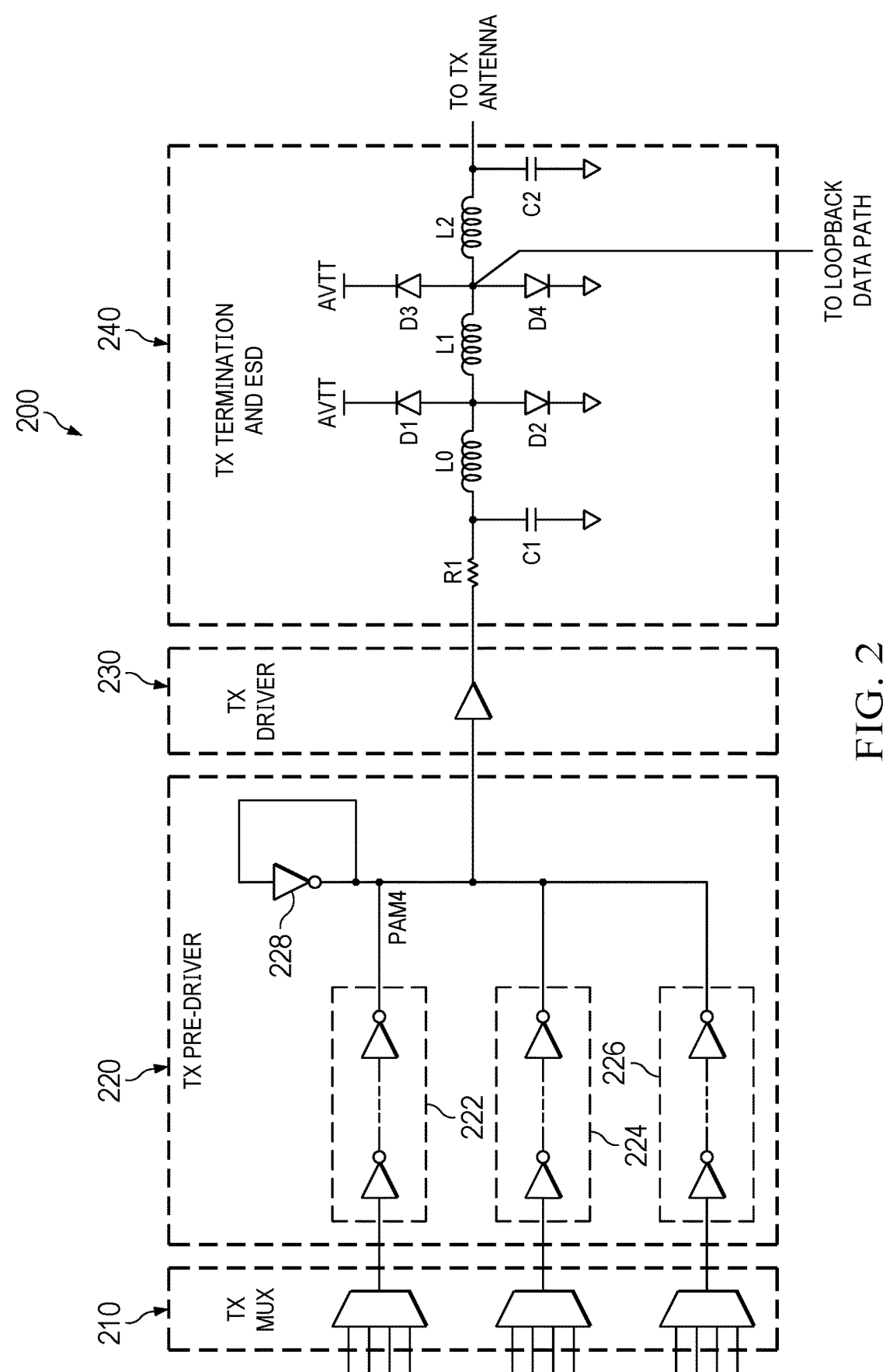
FIG. 2 illustrates a schematic block diagram of an example transmitter circuit in accordance with implementations of the invention.
Figure 3:
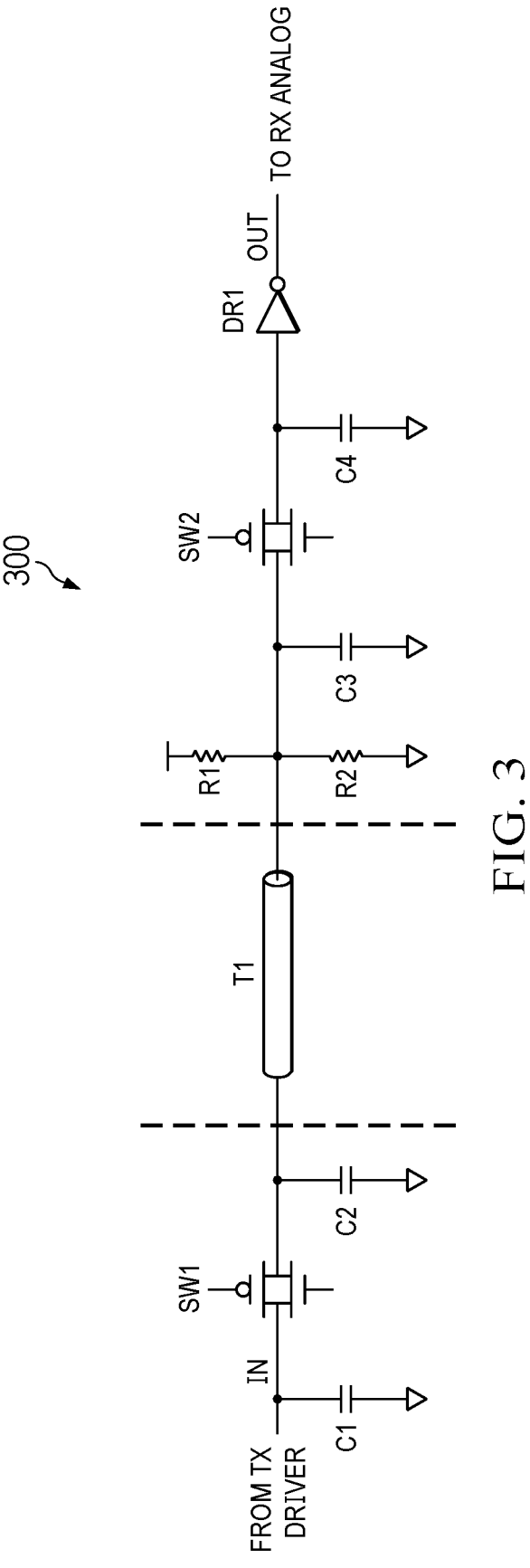
FIG. 3 illustrates a schematic block diagram of an example loopback data path circuit in accordance with implementations of the invention.
Figure 4:
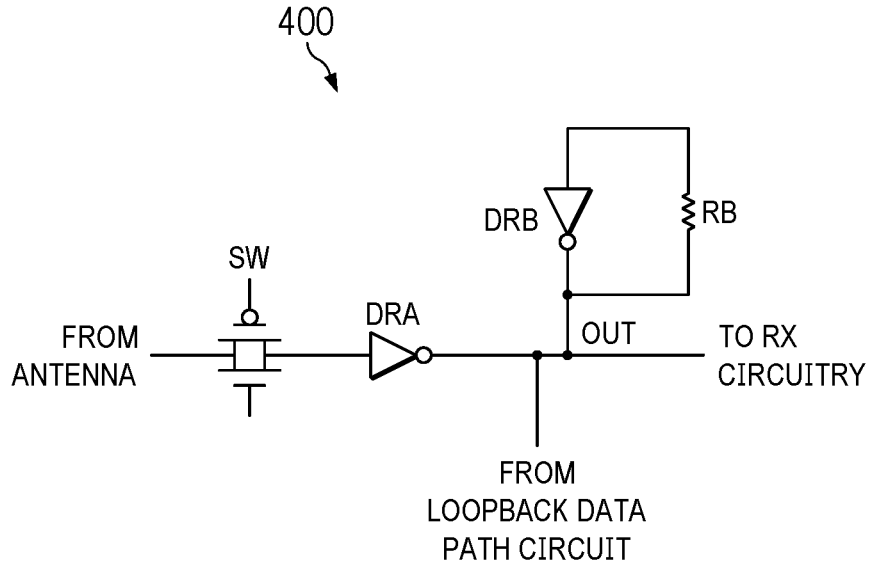
FIG. 4 illustrates a schematic block diagram of an example of a portion of a receiver circuit in accordance with implementations of the invention.
Figure 5:
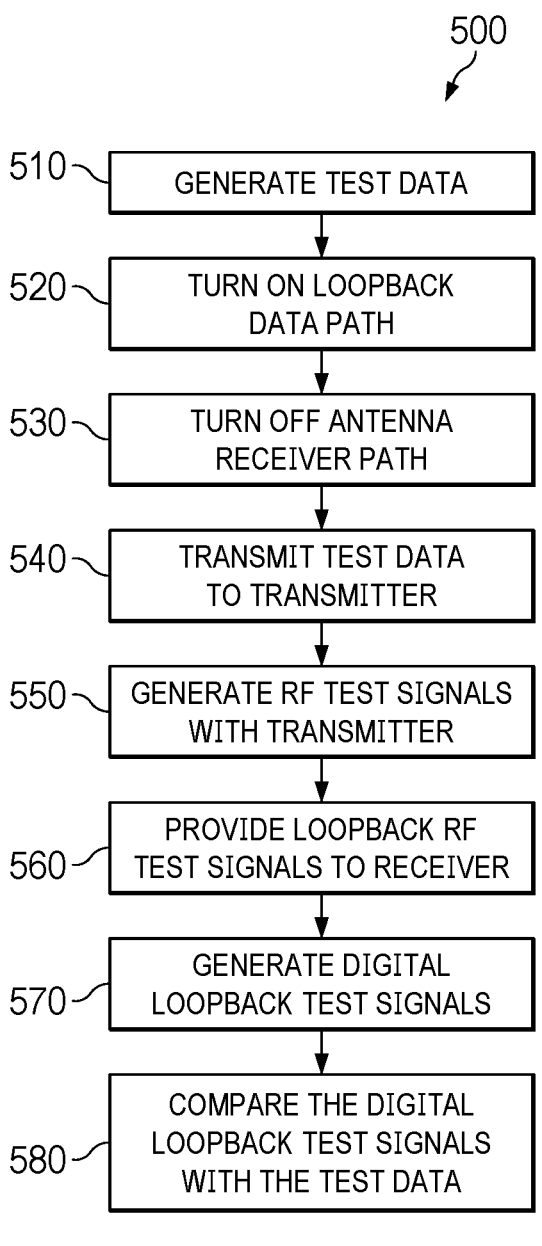
FIG. 5 illustrates a flowchart diagram of an example method of using a transceiver circuit having a loopback data path in accordance with implementations of the invention.
Figure 6:
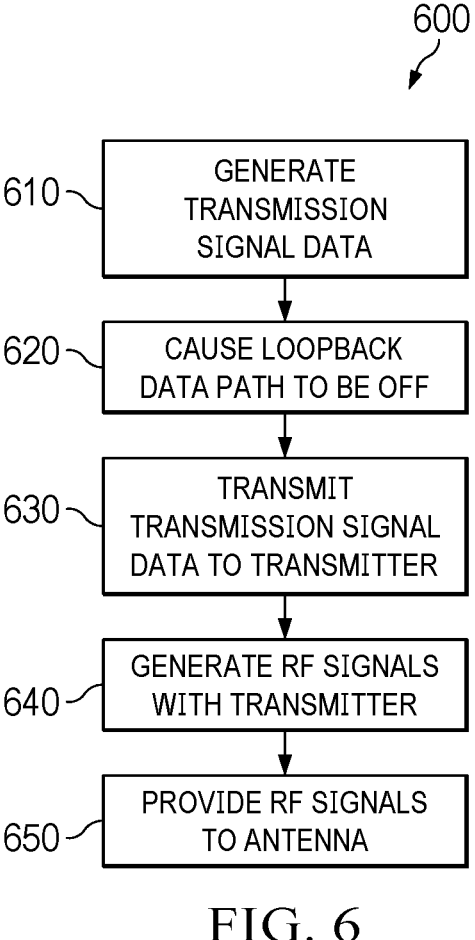
FIG. 6 illustrates a flowchart diagram of an example method of using a transceiver circuit having a loopback data path in accordance with implementations of the invention.
Figure 7:
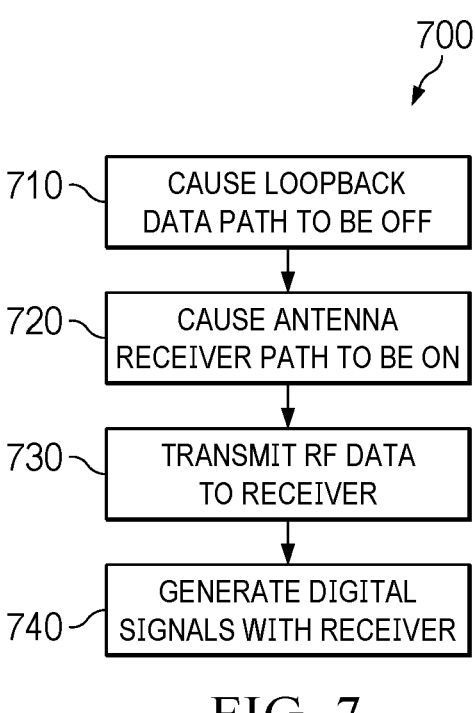
FIG. 7 illustrates a flowchart diagram of an example method of using a transceiver circuit having a loopback data path in accordance with implementations of the invention.

The following description describes certain implementations. FIG. 1 is used to describe an example transceiver circuit. FIG. 2 is used to describe an example transmitter circuit. FIG. 3 is used to describe an example loopback data path circuit. FIG. 4 is used to describe an example of a portion of a receiver circuit. FIGS. 5-7 are used to describe example methods of using a transceiver circuit.

FIG. 1 illustrates a schematic block diagram of an example transceiver circuit 100 including a loopback data path circuit 140 in accordance with implementations of the invention. The illustrated transceiver circuit 100 has specific implementations of circuit features, which, in alternative implementations are implemented using other circuit techniques, for example, as understood by those of skill in the art.

Referring to FIG. 1, transceiver circuit 100 includes controller 110, transmitter logic circuit 120, transmitter driver circuit 130, loopback data path circuit 140, receiver analog circuit 150, analog-to-digital converter circuit (ADC) 155, and receiver logic circuit 160.

Controller 110 is configured to generate control signals for other circuits of transceiver circuit 100, where the control signals cause the other circuits to operate according to various operational modes. For example, controller 110 may include state logic which stores a state corresponding to any of the operational modes, where the state logic generates or determines the control signals such that the control signals cause the other circuits to operate according to the stored operational mode state.

For example, state logic of controller 110 may store an operational mode state corresponding with a transmit state, in which the transceiver may be used to transmit data to a transmitter antenna for example, for broadcasting. Because the state logic stores the transmit state, the control signals generated by controller 110 may cause the transmitter logic circuit 120 to generate and provide data signals to transmitter driver circuit 130, and may cause transmitter driver circuit 130 to generate RF or other signals for the transmitter antenna.

The state logic of controller 110 may store an operational mode state corresponding with a receive state, in which the transceiver may be used to receive data from a receiver antenna. Because the state logic stores the receive state, the control signals generated by controller 110 may cause the receiver analog circuit 150 to receive an RF or other signal from the receiver antenna, and may cause receiver analog circuit 150 to generate and provide a receive signal to receiver logic circuit 160 via ADC 155.

In some implementations, the state logic of controller 110 may store an operational mode state corresponding with both a transmit and receive state, in which the transceiver may be used to receive data from the receiver antenna, and may be used to transmit data to the transmitter antenna. Because the state logic stores the transmit and receive state, the control signals generated by controller 110 may cause the transmitter logic circuit 120 to generate and provide data signals to transmitter driver circuit 130, may cause transmitter driver circuit 130 to generate RF or other signals for the transmitter antenna, may cause the receiver analog circuit 150 to receive an RF or other signal from the receiver antenna, and may cause receiver analog circuit 150 to generate and provide a receive signal to receiver logic circuit 160 via ADC 155.

In some implementations, the state logic of controller 110 may store an operational mode state corresponding with a loopback test state, in which the transceiver circuit 100 may be used to test functionality of the transceiver circuit 100.

Because the state logic stores the loopback test state, the control signals generated by controller 110 may cause the transmitter logic circuit 120 to generate and provide transmitter test data signals to transmitter driver circuit 130, may cause transmitter driver circuit 130 to generate RF or other test signals for the loopback data path circuit 140 based on the transmitter test data signals, may cause the loopback data path circuit 140 to provide loopback RF or other test signals to the receiver analog circuit 150 based on the RF or other test signals, may cause the receiver analog circuit 150 to receive the loopback RF or other test signals from the loopback data path circuit 140, may cause receiver analog circuit 150 to generate and provide a receiver test signals to receiver logic circuit 160 via ADC 155 based on the loopback RF or other test signals, and may cause receiver logic circuit 160 to generate digital loopback test signals based on the receiver test signals. In addition, controller 110 may be configured to compare the digital loopback test signals with the transmitter test data signals to determine whether the transceiver circuit 100 is functioning properly.

FIG. 2 illustrates a schematic block diagram of an example transmitter driver circuit 200 in accordance with implementations of the invention. The illustrated transmitter driver circuit 200 has specific implementations of circuit features, which, in alternative implementations are implemented using other circuit techniques, for example, as understood by those of skill in the art. Transmitter driver circuit 200 may, for example, be used as transmitter driver circuit 130 of transceiver circuit 100. Similarly labeled elements may be as previously described.

Transmitter driver circuit 200 includes transmitter multiplexer 210, transmitter predriver circuit 220, transmitter driver 230, and transmitter termination and ESD (electrostatic discharge) protection 240.

Transmitter multiplexer 210 includes three 4:1 multiplexer circuits having connection states controlled by control circuits from a controller, such as controller 110. Each of the 4:1 multiplexer circuits is connected to a corresponding data path of the three predriver data paths, discussed below. In some implementations, 4:1 multiplexer circuits are used to facilitate four phase data.

Transmitter predriver circuit 220 uses a particular architecture to receive two-bit digital data from transmitter multiplexer 210 and to generate a four-level pulse amplitude modulation signal at summation node PAM4. In alternative implementations, alternative architectures are used to generate different types of signals. Transmitter predriver circuit 220 includes predriver data paths 222, 224, and 226, and includes Gm bias circuit 228.

Gm bias circuit 228 comprises an inverting circuit having its input and output shorted. Accordingly, Gm bias circuit 228 acts as an active series inductor, and boosts effective bandwidth of the circuit.

In addition, each of predriver data paths 222, 224, and 226 includes a set of one or more inverters configured to drive the summation node PAM4 with a Gm circuit according to data received from the corresponding multiplexer circuit. In the illustrated implementation, predriver data path 222 is used to drive the summation node PAM4 according to data corresponding with an LSB (least significant bit) of the two-bit digital data. In addition, in the illustrated implementation, predriver data paths 224 and 226 are cooperatively used to drive the summation node PAM4 according to data corresponding with an MSB (most significant bit) of the two-bit digital data. Accordingly, predriver data paths 222 and 226 receive the same data from transmitter multiplexer 210. In some implementations, each of predriver data paths 222, 224, and 226 are designed to be identically sized, and are, therefore, identically or about identically or substantially identically sized when manufactured.

Transmitter driver 230 comprises driver circuitry configured to receive an input signal from summation node PAM4, and to drive transmitter termination and ESD protection circuit 240 and the TX antenna with a signal corresponding with the input signal. Transmitter driver 230 may comprise any suitable architecture, for example, known to those of skill in the art.

Transmitter termination and ESD protection circuit 240 includes series resistance R1 and series inductors, L0, L1, and L2, as illustrated. In addition, transmitter termination and ESD protection circuit 240 includes termination capacitor C1 connected to series resistor R1 and to series inductor L0, and includes termination capacitor C2 connected to series inductor L2, as illustrated. Furthermore, transmitter termination and ESD protection circuit 240 includes ESD diodes D1 and D2 connected to series inductors L0 and L1, and includes ESD diodes D3 and D4 connected to series inductors L1 and L2, as illustrated.

ESD diodes D3 and D4 provide primary protection against ESD events transmitting current thereto through series inductor L1. Furthermore, ESD diodes D1 and D2 provide secondary protection against ESD events. In the illustrated implementation, both the primary ESD protection and the secondary ESD protection provide protection against both positive and negative ESD events.

The series resistances and series inductances of each of the branches of transmitter termination and ESD protection circuit 240, and the capacitances of each of the nodes of transmitter termination and ESD protection circuit 240 collectively provide termination for transmitter driver 230. For example, the series resistances, series inductances, and node capacitances of transmitter termination and ESD protection circuit 240 may be sized to provide a 50-ohm termination, and may, when manufactured, provide a 50-ohm termination for transmitter driver 230.

ESD diodes D1, D2, D3, and D4, the loopback data path, the connection structures between termination capacitor C2 and the TX antenna, and the TX antenna each have impedances which affect the termination provided by transmitter termination and ESD protection circuit 240. Accordingly, ESD diodes D1, D2, D3, and D4, the loopback data path, the connection structures between termination capacitor C2 and the TX antenna, and the TX antenna each contribute to the termination value (e.g., 50 ohms) provided by transmitter termination and ESD protection circuit 240 for transmitter driver 230, where the 50 ohm termination value is 50 ohms as understood by those of skill in the art.

In the illustrated implementation, the loopback data path is connected to the node esd0 shared by series inductors L1 and L2 and ESD diodes D3 and D4. In such implementations, much of the termination for the transmitter driver 230 is advantageously provided by the elements of the transmitter termination and ESD protection circuit 240 and predominantly by the elements of the transmitter termination and ESD protection circuit 240 between the node esd0 and the transmitter driver 230. In addition, when the loopback data path is connected to node esd0, the loopback data path benefits from the ESD protection provided by ESD diodes D3 and D4, and, in some implementations, to a lesser degree by ESD diodes D1 and D2. Additional advantages of connecting the loopback data path to the node esd0 are apparent to those of skill in the art from the illustrated circuit in FIG. 2.

In alternative implementations, the loopback data path is connected to the node shared by series inductor L2 termination capacitor C2. In such implementations, much of the termination for the transmitter driver 230 is advantageously provided by the elements of the transmitter termination and ESD protection circuit 240 and predominantly by the elements of the transmitter termination and ESD protection circuit 240 between the node shared by series inductor L2 termination capacitor C2 and the transmitter driver 230. In addition, when the loopback data path is connected to the node shared by series inductor L2 termination capacitor C2, the loopback data path may not sufficiently benefit from the ESD protection provided by ESD diodes D3 and D4, and by ESD diodes D1 and D2, and the loopback data path may be designed and manufactured to provide ESD protection. Additional advantages of connecting the loopback data path to the node shared by series inductor L2 termination capacitor C2 are apparent to those of skill in the art from the illustrated circuit in FIG. 2.

In alternative implementations, the loopback data path is connected to the node esd1 shared by series inductors L0 and L1 and ESD diodes D1 and D2. In such implementations, some of the termination for the transmitter driver 230 is advantageously provided by the elements of the transmitter termination and ESD protection circuit 240 and predominantly by the elements of the transmitter termination and ESD protection circuit 240 between the node esd1 and the transmitter driver 230. In addition, when the loopback data path is connected to node esd1, the loopback data path benefits from the ESD protection provided by ESD diodes D3 and D4, and provided by ESD diodes D1 and D2, and the loopback data path may be designed and manufactured to provide additional ESD protection. Additional advantages of connecting the loopback data path to the node esd1 are apparent to those of skill in the art from the illustrated circuit in FIG. 2.

In some implementations, the loopback data path is connected to the node shared by series resistor R1, termination capacitor C1, and series inductor L0. In such implementations, some of the termination for the transmitter driver 230 is advantageously provided by the elements of the transmitter termination and ESD protection circuit 240 and predominantly by the series resistor R1. In addition, when the loopback data path is connected to the node shared by series resistor R1, termination capacitor C1, and series inductor L0, the loopback data path benefits from the ESD protection provided by ESD diodes D3 and D4, and by ESD diodes D1 and D2, and the loopback data path may be designed and manufactured to provide additional ESD protection using. Additional advantages of connecting the loopback data path to the node shared by series resistor R1, termination capacitor C1, and series inductor L0 are apparent to those of skill in the art from the illustrated circuit in FIG. 2.

In some implementations, the loopback data path is connected to the node shared by transmitter driver 230 and series resistor R1. In addition, when the loopback data path is connected to the node shared by transmitter driver 230 and series resistor R1, the loopback data path benefits from the ESD protection provided by ESD diodes D3 and D4, and by ESD diodes D1 and D2, and the loopback data path may be designed and manufactured to provide additional ESD protection. Additional advantages of connecting the loopback data path to the node shared by transmitter driver 230 and series resistor R1 are apparent to those of skill in the art from the illustrated circuit in FIG. 2.

In implementations having the loopback data path connected to a node having characteristics, features, and/or element connections similar or identical to those illustrated in FIG. 2, the signal received by the loopback data path is advantageously generated or conditioned or modified or terminated by the circuit elements of the transmitter driver circuit 200. Accordingly, the functionality of the transmitter driver circuit 200 is represented in the signal received by the loopback data path. Consequently, when used in transceiver circuits such as transceiver circuit 100, the functionality of the transmitter driver circuit 200 may be tested using the loopback data path and the receiver circuitry.

In some implementations, alternative architectures are used for termination and ESD protection. In such implementations, the loopback data path may be connected to a node having characteristics similar or identical to the node shared by series inductors L1 and L2 and ESD diodes D3 and D4, the node shared by series inductors L0 and L2 and ESD diodes D1 and D2, the node shared by series resistor R1, termination capacitor C1, and series inductor L0, or the node shared by transmitter driver 230 and series resistor R1. Accordingly, in such implementations, the impedance of the loopback data path contributes to the termination value (e.g., 50 ohms) provided by the transmitter termination and ESD protection circuit for transmitter driver 230.

FIG. 3 illustrates a schematic block diagram of an example loopback data path circuit 300 in accordance with implementations of the invention. The illustrated loopback data path circuit 300 has specific implementations of circuit features, which, in alternative implementations are implemented using other circuit techniques, for example, as understood by those of skill in the art. Loopback data path circuit 300 may, for example, be used as loopback data path circuit 140 of transceiver circuit 100. Similarly labeled elements may be as previously described.

In the illustrated implementation, loopback data path circuit 300 includes loopback switch SW1 and loopback termination capacitors C1 and C2, loopback transmission line T1, loopback termination resistors R1 and R2, loopback switch SW2, loopback termination capacitors C3 and C4, and Gm driver DR1. In some implementations, loopback switch SW2 and termination capacitor C4 are omitted to, for example, reduce component count, reduce series resistance, to provide an input bias voltage to Gm driver Dr1 with loopback termination resistors R1 and R2, or to provide other benefits.

Loopback switches SW1 and SW2 receive control signals from a controller, such as controller 110. In response to the control signals, loopback switches SW1 and SW2 have either a relatively high resistance state or a relatively low resistance state. When loopback switch SW1 is in the relatively high resistance state, signals from input node IN do not or do not substantially pass to the transmission line T1. In addition, when loopback switch SW2 is in the relatively high resistance state, signals from the transmission line T1 do not or do not substantially pass to Gm driver DR1. When in the high resistance state, loopback switches SW1 and SW2 provide isolation between the transmission path and the receive path.

When loopback switch SW1 is in the relatively low resistance state, signals from input node IN pass to the transmission line T1. In addition, when loopback switch SW2 is in the relatively low resistance state, signals from the transmission line T1 pass to Gm driver DR1, and from Gm driver DR1 to output node OUT. Accordingly, when loopback switches SW1 and SW2 are both in the relatively low resistance state, signals from input node IN pass to the transmission line T1, from the transmission line T1 pass to Gm driver DR1, and from Gm driver DR1 to output node OUT.

When input node IN is connected to a driver circuit, such as transmitter driver circuit 200, termination capacitor C1 contributes to the termination presented to the driver circuit. In addition, when input node IN is connected to the driver circuit and when loopback switch SW1 is in the high resistance state, capacitances of loopback switch SW1 connected to input node IN also contribute to the termination presented to the driver circuit. Furthermore, when input node IN is connected to the driver circuit and when loopback switches SW1 and SW2 are in the low resistance state, impedances of loopback switch SW1, termination capacitor C2, transmission line T1, termination resistors R1 and R2, termination capacitor C3, loopback switch SW2, termination capacitor C3, and Gm driver DR one also contribute to the termination presented to the driver circuit.

In some implementations, additional ESD protection diodes are used. For example, one or more additional ESD protection diodes may be connected to loopback switch SW1, for example, between termination capacitor C1 and loopback switch SW1. In some implementations, one or more additional ESD protection diodes are connected to loopback switch SW1 between termination capacitor C2 and loopback switch SW1. In some implementations, a series resistor is connected to loopback switch SW1.

FIG. 4 illustrates a schematic block diagram of an example of a portion of a receiver circuit 400 in accordance with implementations of the invention. The illustrated receiver circuit portion 400 has specific implementations of circuit features, which, in alternative implementations are implemented using other circuit techniques, for example, as understood by those of skill in the art. Receiver circuit portion 400 may, for example, be used as an input portion of receiver analog circuit 150 of transceiver circuit 100. Similarly labeled elements may be as previously described.

In the illustrated implementation, receiver circuit portion 400 includes antenna switch SW, antenna Gm driver DRA, bias Gm driver DRB, and bias resistor RB. In some implementations, antenna switch SW is omitted.

Bias Gm driver DRB comprises an inverting circuit having its input and output connected by bias resistor RB. Accordingly, bias Gm driver DRB generates a mid-level bias voltage at output node OUT which acts as a summation node to sum signals from antenna Gm driver DRA and from a loopback data path circuit connected to the summation node.

Antenna switch SW receives control signals from a controller, such as controller 110. In response to the control signals, antenna switch SW has either a relatively high resistance state or a relatively low resistance state. When antenna switch SW is in the relatively high resistance state, signals from input node IN do not or do not substantially pass to the antenna Gm driver DRA. In addition, when antenna switch SW is in the relatively low resistance state, signals from input node IN pass to the antenna Gm driver DRA, and from the antenna Gm driver DRA to receive circuitry connected to output node OUT. In some implementations, the receive circuitry connected to output node OUT may include one or more of a continuous time linear equalizer, a filter, an amplifier, and another circuit.

In some implementations, a transceiver circuit, such as transceiver circuit 100 includes a loopback data path circuit having features similar or identical to loopback data path circuit 300, and includes a receiver analog circuit having an input portion having features similar or identical to receiver circuit portion 400. In such implementations, a controller of the transceiver circuit, such as controller 110 of transceiver circuit 100, generates control signals to cause the loopback data path circuit and receiver circuit portion to operate according to various operational modes.

For example, the controller may cause the loopback data path circuit and the receiver analog circuit to operate according to a receive operational mode by causing an antenna switch, such as antenna switch SW of receiver circuit portion 400 to be in a low resistance state and by simultaneously causing loopback switches, such as loopback switches SW1 and SW2 of loopback data path circuit 300 to be in a high resistance state. Accordingly, in the receive operational mode, the receiver analog circuit operates to process RF or other signals received from a receiver antenna, and the loopback data path circuit does not transmit signals from a transmitter of the transceiver circuit to the receiver analog circuit.

As another example, the controller may cause the loopback data path circuit and the receiver analog circuit to operate according to a loopback test mode by causing an antenna switch, such as antenna switch SW of receiver circuit portion 400 to be in a high resistance state and by simultaneously causing loopback switches, such as loopback switches SW1 and SW2 of loopback data path circuit 300 to be in a low resistance state. Accordingly, in the loopback test mode, the receiver analog circuit may not process RF or other signals received from the receiver antenna, but, instead, receive and process signals form the transmitter of the transceiver circuit via the loopback data path circuit so that, for example, the controller may determine whether the transceiver circuit or portions of the transceiver circuit is functioning properly.

FIGS. 2-4 illustrate schematic block diagrams of single ended circuits. It will be understood that the illustrated aspects may be implemented with differential circuits, which are not included herein for the sake of simplified illustrations. Additionally, it will be understood that differential circuit implementations may include certain circuitry to support or facilitate the differential implementations. In some embodiments, common mode control circuitry may be included. For example, an amplified difference between a receive common mode, for example, at the output of the loopback path and a common mode reference may be provided to a common mode control circuit for the transmitter driver circuit so that the transmit common mode is adjusted to minimize the amplified difference.

FIG. 5 illustrates a flowchart diagram of an example method 500 of using a transceiver circuit having a loopback data path in accordance with implementations of the invention. The illustrated method 500 has specific processes, which, in alternative implementations are implemented using other techniques, for example, as understood by those of skill in the art. In some implementations, certain processes are omitted. In some implementations additional processes not mentioned are performed. In some implementations certain processes are performed in alternate sequences. Method 500 may, for example, be performed, for example by a transceiver circuit, such as transceiver circuit 100.

At 510, test data is generated or accessed. For example, a controller, such as controller 110 may generate or access test data, for example stored in a memory. The test data may be configured to exercise a transmitter of the transceiver circuit according to one or more test strategies. For example, the test data may be configured to exercise the transmitter according to various test patterns exercising the transmitter and various particular signal frequencies and particular signal amplitudes. In addition, the test data may be configured to exercise the transmitter such that signals generated by the transmitter cause the receiver to produce digital signal data which may be compared with the test data to determine whether at least one of the transceiver circuit, the transmitter, the loopback data path, and the receiver are functioning properly.

At 520, the loopback data path of the transceiver circuit is turned on. For example, the controller may generate control signals which cause loopback switches, such as loopback switches SW1 and SW2 of loopback data path circuit 300 to be in a low resistance state. As a result, signals received at an input of the loopback data path are propagated to the output of the loopback data path.

At 530, the receiver is disconnected from a receiver antenna. For example, the controller may generate control signals which cause an antenna switch, such as antenna switch SW of receiver circuit portion 400 to be in a high resistance state. As a result, signals received at an input of the receiver from the receiver antenna are isolated from the receiver and may not affect or may not substantially affect data generated by the receiver.

At 540, the test data is transmitted to the transmitter. For example, the controller may cause the test data to be provided to the transmitter of the transceiver circuit.

At 550, the transmitter generates RF or other test signals based on the received test data. For example, the transmitter may process the received test data with at least one of a predriver circuit and a driver circuit to generate the RF or other test signals. In addition, the transmitter provides the RF or other test signals to the loopback data circuit, for example with an electrically conductive path connected to the loopback data circuit and to a driver configured to drive a transmit antenna.

At 560, loopback RF or other test signals are provided to the receiver. For example, the loopback data path circuit may provide the RF or other test signals received from the transmitter to the receiver as the loopback RF or other test signals. In some implementations, the loopback data path circuit modifies the RF or other test signals and provides the modified RF or other test signals to the receiver as the loopback RF or other test signals.

At 570, the receiver generates digital loopback test signals. For example, using receiver circuitry, such as equalizer circuitry, filter circuitry, amplifier circuitry, and analog-to-digital converter circuitry, the receiver may generate digital loopback test signals based on the loopback are after test signals received from the loopback data path circuit.

At 580, the digital loopback test signals generated by the receiver or measurement data signals generated based on the digital loopback test signals are compared with the test data or reference data generated based on the test data. In addition, based on the comparison, the controller or another circuit may determine whether at least one of the transceiver circuit, the transmitter, the loopback data path, and the receiver are functioning properly.

FIG. 6 illustrates a flowchart diagram of an example method 600 of using a transceiver circuit having a loopback data path in accordance with implementations of the invention. The illustrated method 600 has specific processes, which, in alternative implementations are implemented using other techniques, for example, as understood by those of skill in the art. In some implementations, certain processes are omitted. In some implementations additional processes not mentioned are performed. In some implementations certain processes are performed in alternate sequences. Method 600 may, for example, be performed, for example by a transceiver circuit, such as transceiver circuit 100.

At 610, test data is generated or accessed. For example, a controller, such as controller 110 may generate or access data for signal transmission, for example stored in a memory. The signal transmission data may be configured to encode information to be transmitted to a remote receiver with a transmit antenna.

At 620, the loopback data path circuit of the transceiver circuit is turned off, or caused to be off, or caused to remain off. For example, the controller may generate control signals which cause loopback switches, such as loopback switches SW1 and SW2 of loopback data path circuit 300 to be in a high resistance state. As a result, signals received at an input of the loopback data path are not propagated to the output of the loopback data path.

At 630, the signal transmission data is provided to the transmitter. For example, the controller may cause the signal transmission data to be provided to a transmitter driver circuit, such as transmitter driver circuit 130 of transceiver circuit 100.

At 640, while the loopback data path circuit is off, the transmitter generates RF or other signals based on the received signal transmission data. For example, the transmitter may process the received signal transmission data with at least one of a predriver circuit and a driver circuit to generate the RF or other signals.

At 650, the transmitter provides the RF or other signals to the transmit antenna. For example, the transmitter may provide the RF or other signals to an electrically conductive path connected to the transmit antenna with a driver configured to drive the transmit antenna.

FIG. 7 illustrates a flowchart diagram of an example method 700 of using a transceiver circuit having a loopback data path in accordance with implementations of the invention. The illustrated method 700 has specific processes, which, in alternative implementations are implemented using other techniques, for example, as understood by those of skill in the art. In some implementations, certain processes are omitted. In some implementations additional processes not mentioned are performed. In some implementations certain processes are performed in alternate sequences. Method 700 may, for example, be performed, for example by a transceiver circuit, such as transceiver circuit 100.

At 710, the loopback data path circuit of the transceiver circuit is turned off, or caused to be off, or caused to remain off. For example, the controller may generate control signals which cause loopback switches, such as loopback switches SW1 and SW2 of loopback data path circuit 300 to be in a high resistance state. As a result, signals received at an input of the loopback data path are not propagated to the output of the loopback data path.

At 720, the receiver is caused to be connected to a receiver antenna or is caused to remain connected to the receiver antenna. For example, the controller may generate control signals which cause an antenna switch, such as antenna switch SW of receiver circuit portion 400 to be in a low resistance state. As a result, RF or other signals received at an input of the receiver from the receiver antenna are transmitted to the receiver and form the basis for digital data generated by the receiver.

At 730, while the loopback data path circuit is caused to be off, the RF or other signals from the receiver antenna are provided to the receiver. For example, the RF or other signals may be provided to a receiver analog circuit, such as receiver analog circuit 150 of transceiver circuit 100.

At 740, analog signals corresponding with the data of the RF or other signals from the receiver antenna are provided to an analog-to-digital converter circuit, such as ADC 155 of transceiver circuit 100. In addition, the analog-to-digital converter circuit generates digital data corresponding with the analog signals provided thereto.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a transceiver circuit. The transceiver circuit also includes a transmitter driver circuit configured to drive a transmit antenna. The circuit also includes a receiver circuit configured to generate digital signals based on received signals. The circuit also includes a loopback data path circuit electrically connected to the transmitter driver circuit and to the receiver circuit, where the loopback data path circuit is configured to conditionally provide signals from the transmitter driver circuit to the receiver circuit according to one or more control signals. The circuit also includes a controller configured to generate the control signals. Other embodiments of this aspect include corresponding computer systems, apparatus, and computer programs recorded on one or more computer storage devices, each configured to perform the actions of the methods.

Implementations may include one or more of the following features. A controller configured to generate the control signals. The transceiver circuit where the loopback data path circuit is electrically connected to the transmitter driver circuit through a transmitter termination and electrostatic discharge (esd) protection circuit. The loopback data path circuit is electrically connected to the transmitter driver circuit through a transmitter termination and electrostatic discharge (esd) protection circuit. The transceiver circuit where the transmitter termination and esd protection circuit may include a primary esd protection circuit and a secondary esd protection circuit, and where the loopback data path circuit is electrically connected to the primary esd protection circuit. The transmitter termination and esd protection circuit may include a primary esd protection circuit and a secondary esd protection circuit, and where the loopback data path circuit is electrically connected to the primary esd protection circuit. The transceiver circuit where the primary esd protection circuit may include first and second esd protection diodes, and where the loopback data path circuit is electrically connected to the first and second esd protection diodes. The primary esd protection circuit may include first and second esd protection diodes, and where the loopback data path circuit is electrically connected to the first and second esd protection diodes. The transceiver circuit where the transmitter termination and esd protection circuit may include first and second inductors connected in series, and where the loopback data path circuit is electrically connected to the first and second inductors. The transmitter termination and esd protection circuit may include first and second inductors connected in series, and where the loopback data path circuit is electrically connected to the first and second inductors. the transceiver circuit where the loopback data path circuit may include one or more loopback switches having conductivity states controlled by the control signals, where, when the one or more loopback switches are in a low resistance conductivity state, the loopback data path circuit is configured to provide signals from the transmitter driver circuit to the receiver circuit, and where, when the one or more loopback switches are in a high resistance conductivity state, at least a portion of the loopback data path circuit is electrically isolated from the transmitter driver circuit to the receiver circuit. The loopback data path circuit may include one or more loopback switches having conductivity states controlled by the control signals, where, when the one or more loopback switches are in a low resistance conductivity state, the loopback data path circuit is configured to provide signals from the transmitter driver circuit to the receiver circuit, and where, when the one or more loopback switches are in a high resistance conductivity state, at least a portion of the loopback data path circuit is electrically isolated from the transmitter driver circuit to the receiver circuit. The transceiver circuit where the receiver circuit may include: a connector configured to be electrically connected to a receiver antenna; and at least one receiver switch having a conductivity state controlled by the control signals, and configured to selectively electrically connect the receiver circuit to the connector. The control signals may include a first set of control signals which cause the at least one receiver switch of the receiver circuit to be in a high resistance state and which cause the one or more switches of the loopback data path circuit to be in a low resistance state. The control signals may include a first set of control signals which cause the at least one receiver switch of the receiver circuit to be in a high resistance state and which cause the one or more switches of the loopback data path circuit to be in a low resistance state. the transceiver circuit where the control signals may include a second set of control signals which cause the at least one receiver switch of the receiver circuit to be in a low resistance state and which cause the one or more switches of the loopback data path circuit to be in a high resistance state. The control signals may include a second set of control signals which cause the at least one receiver switch of the receiver circuit to be in a low resistance state and which cause the one or more switches of the loopback data path circuit to be in a high resistance state. The transceiver circuit where the controller is configured to determine whether the transceiver circuit passes a functionality test based on the digital signals generated by the receiver circuit. Implementations of the described techniques may include hardware, a method or process, or computer software on a computer-accessible medium.

One general aspect includes the transceiver circuit. The method also includes a method of using a transceiver circuit, the transceiver circuit may include a transmitter driver circuit configured to drive a transmit antenna, a receiver circuit configured to generate digital signals based on received signals, a loopback data path circuit, and a controller, the method may include. The method also includes with the transmitter driver circuit, generating test signals based on test data signals. The method also includes with the controller, generating a first set of control signals, where the first set of control signals cause the loopback data path circuit to provide loopback test signals to the receiver circuit based on the test signals of the transmitter driver circuit. The method also includes with the receiver circuit, generating the digital signals based on the loopback test signals. Other embodiments of this aspect include corresponding computer systems, apparatus, and computer programs recorded on one or more computer storage devices, each configured to perform the actions of the methods.

Implementations may include one or more of the following features. With the receiver circuit, generating the digital signals based on the loopback test signals. the method where the transmitter driver circuit may include a transmitter termination and electrostatic discharge (esd) protection circuit, and where the test signals are generated at least partly with the transmitter termination and esd protection circuit. The transmitter driver circuit may include a transmitter termination and electrostatic discharge (esd) protection circuit, and where the test signals are generated at least partly with the transmitter termination and esd protection circuit. the method where the receiver circuit may include a receiver antenna connector configured to be electrically connected to a receiver antenna, the method may include, with the controller, generating a second set of control signals, where the second set of control signals prevent the loopback data path circuit from providing signals from the transmitter driver circuit to the receiver circuit, and cause the receiver circuit to be electrically connected to the receiver antenna connector. The receiver circuit may include a receiver antenna connector configured to be electrically connected to a receiver antenna, the method may include, with the controller, generating a second set of control signals, where the second set of control signals prevent the loopback data path circuit from providing signals from the transmitter driver circuit to the receiver circuit, and cause the receiver circuit to be electrically connected to the receiver antenna connector. the method where the first set of control signals cause the receiver circuit to be electrically isolated from the receiver antenna connector. The first set of control signals cause the receiver circuit to be electrically isolated from the receiver antenna connector. The method where the transceiver circuit further may include a termination and esd protection circuit, the method may include, with the termination and esd protection circuit, terminating the test signals of the transmitter driver circuit. The transceiver circuit further may include a termination and esd protection circuit, the method may include, with the termination and esd protection circuit, terminating the test signals of the transmitter driver circuit. The method where the transceiver circuit further may include a termination and esd protection circuit, the method may include, with the termination and esd protection circuit, providing esd protection circuitry at a node connected to the loopback data path circuit. The transceiver circuit further may include a termination and esd protection circuit, the method may include, with the termination and esd protection circuit, providing esd protection circuitry at a node connected to the loopback data path circuit. The method may include, with the controller, determining whether the transceiver circuit passes a functionality test based on the digital signals generated by the receiver circuit. Implementations of the described techniques may include hardware, a method or process, or computer software on a computer-accessible medium.

One general aspect includes the method. The method also includes a method of using a transceiver circuit, the transceiver circuit may include a transmitter driver circuit configured to drive a transmit antenna, a receiver circuit configured to generate digital signals based on received signals, a loopback data path circuit, and a controller, the method may include. The method also includes with the transmitter driver circuit, generating signals based on data signals. The method also includes with the controller, generating a first set of control signals, where the first set of control signals cause at least a portion of the loopback data path circuit to be electrically isolated from the transmitter driver circuit. Other embodiments of this aspect include corresponding computer systems, apparatus, and computer programs recorded on one or more computer storage devices, each configured to perform the actions of the methods.

Implementations may include one or more of the following features. With the controller, generating a first set of control signals, where the first set of control signals cause at least a portion of the loopback data path circuit to be electrically isolated from the transmitter driver circuit. The method where the transceiver circuit further may include a transmit antenna connector configured to be electrically connected to the transmit antenna, the method may include, with the transmitter driver circuit, providing the signals to the transmit antenna connector. The transceiver circuit further may include a transmit antenna connector configured to be electrically connected to the transmit antenna, the method may include, with the transmitter driver circuit, providing the signals to the transmit antenna connector. the method where the transceiver circuit further may include a receiver antenna connector configured to be electrically connected to a receiver antenna, and where the first set of control signals further cause the receiver circuit to be electrically connected to the receiver antenna connector. Implementations of the described techniques may include hardware, a method or process, or computer software on a computer-accessible medium.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. A transceiver circuit, comprising:
a transmitter driver circuit configured to drive a transmit antenna;
a receiver circuit configured to generate digital signals based on received signals;
a transmitter termination and electrostatic discharge (ESD) protection circuit connected between the transmitter driver circuit and an output node configured to be connected to the transmit antenna;
a loopback data path circuit electrically connected to the transmitter driver circuit through the transmitter termination and ESD protection circuit at a connection point between the transmitter driver circuit and the output node, and electrically connected to the receiver circuit, wherein the loopback data path circuit is configured to conditionally provide signals from the transmitter driver circuit to the receiver circuit according to one or more control signals; and
a controller configured to generate the one or more control signals.

2. The transceiver circuit of claim 1, wherein the transmitter termination and ESD protection circuit comprises a primary ESD protection circuit and a secondary ESD protection circuit, and wherein the loopback data path circuit is electrically connected to the primary ESD protection circuit.

3. The transceiver circuit of claim 2, wherein the primary ESD protection circuit comprises first and second ESD protection diodes, and wherein the loopback data path circuit is electrically connected to the first and second ESD protection diodes.

4. The transceiver circuit of claim 1, wherein the transmitter termination and ESD protection circuit comprises first and second inductors connected in series, and wherein the loopback data path circuit is electrically connected to the first and second inductors.

5. The transceiver circuit of claim 1, wherein the loopback data path circuit comprises one or more loopback switches having conductivity states controlled by the one or more control signals, wherein, when the one or more loopback switches are in a low resistance conductivity state, the loopback data path circuit is configured to provide signals from the transmitter driver circuit to the receiver circuit, and wherein, when the one or more loopback switches are in a high resistance conductivity state, at least a portion of the loopback data path circuit is electrically isolated from the transmitter driver circuit and the receiver circuit.

6. The transceiver circuit of claim 5, wherein the receiver circuit comprises:
a connector configured to be electrically connected to a receiver antenna; and
at least one receiver switch having a conductivity state controlled by the one or more control signals, and configured to selectively electrically connect the receiver circuit to the connector.

7. The transceiver circuit of claim 6, wherein the one or more control signals comprise a first set of control signals which cause the at least one receiver switch of the receiver circuit to be in a high resistance state and which cause the one or more loopback switches of the loopback data path circuit to be in a low resistance state.

8. The transceiver circuit of claim 6, wherein the one or more control signals comprise a second set of control signals which cause the at least one receiver switch of the receiver circuit to be in a low resistance state and which cause the one or more loopback switches of the loopback data path circuit to be in a high resistance state.

9. The transceiver circuit of claim 1, wherein the controller is configured to determine whether the transceiver circuit passes a functionality test based on the digital signals generated by the receiver circuit.

10. A method of using a transceiver circuit, the transceiver circuit comprising a transmitter driver circuit configured to drive a transmit antenna, a receiver circuit configured to generate digital signals based on received signals, a termination and electrostatic discharge (ESD) protection circuit, a loopback data path circuit, and a controller, the method comprising:
with the transmitter driver circuit, generating test signals based on test data signals;
with the controller, generating a first set of control signals, wherein the first set of control signals cause the loopback data path circuit to provide loopback test signals to the receiver circuit from a node between first and second series inductors of the termination and ESD protection circuit based on the test signals of the transmitter driver circuit; and
with the receiver circuit, generating the digital signals based on the loopback test signals.

11. The method of claim 10, wherein the transmitter driver circuit comprises the termination and ESD protection circuit, and wherein the test signals are generated at least partly with the termination and ESD protection circuit.

12. The method of claim 10, wherein the receiver circuit comprises a receiver antenna connector configured to be electrically connected to a receiver antenna, the method further comprising, with the controller, generating a second set of control signals, wherein the second set of control signals prevent the loopback data path circuit from providing signals from the transmitter driver circuit to the receiver circuit, and cause the receiver circuit to be electrically connected to the receiver antenna connector.

13. The method of claim 12, wherein the first set of control signals cause the receiver circuit to be electrically isolated from the receiver antenna connector.

14. The method of claim 10, further comprising, with the termination and ESD protection circuit, terminating the test signals of the transmitter driver circuit.

15. The method of claim 10, further comprising, with the termination and ESD protection circuit, providing ESD protection circuitry at a node connected to the loopback data path circuit.

16. The method of claim 10, further comprising, with the controller, determining whether the transceiver circuit passes a functionality test based on the digital signals generated by the receiver circuit.

17. A method of using a transceiver circuit, the transceiver circuit comprising a transmitter driver circuit configured to drive a transmit antenna, a receiver circuit configured to generate digital signals based on received signals, a loopback data path circuit and a controller, the method comprising:

with the transmitter driver circuit, generating signals based on data signals through a signal path that includes the loopback data path circuit, wherein the loopback data path circuit is electrically connected to the transmitter driver circuit through a termination and electrostatic discharge protection circuit at a connection point between the transmitter driver circuit and an output node and providing the signals through the output node to the transmit antenna; and with the controller, generating a first set of control signals, wherein the first set of control signals cause at least a portion of the loopback data path circuit to be electrically isolated from the transmitter driver circuit.

18. The method of claim 17, wherein the transceiver circuit further comprises a transmit antenna connector configured to be electrically connected to the transmit antenna, the method further comprising, with the transmitter driver circuit, providing the signals to the transmit antenna connector.

19. The method of claim 17, wherein the transceiver circuit further comprises a receiver antenna connector configured to be electrically connected to a receiver antenna, and wherein the first set of control signals further cause the receiver circuit to be electrically connected to the receiver antenna connector.

20. The transceiver circuit of claim 1, wherein the transmitter termination and ESD protection circuit comprises first and second inductors and first and second electrostatic discharge protection diodes, and wherein the loopback data path circuit is electrically connected to a node shared by the first and second inductors and first and second electrostatic discharge protection diodes.

* * * * *